(12) United States Patent
Lim

(10) Patent No.: US 11,163,348 B2
(45) Date of Patent: *Nov. 2, 2021

(54) CONNECTORS THAT CONNECT A STORAGE DEVICE AND POWER SUPPLY CONTROL DEVICE, AND RELATED POWER SUPPLY CONTROL DEVICES AND HOST INTERFACE DEVICES

(71) Applicant: Samsung Electronics Co., Ltd., Suwon-si (KR)

(72) Inventor: Gwangman Lim, Seoul (KR)

(73) Assignee: Samsung Electronics Co., Ltd.

( * ) Notice: Subject to any disclaimer, the term of this patent is extended or adjusted under 35 U.S.C. 154(b) by 154 days.

This patent is subject to a terminal disclaimer.

(21) Appl. No.: 16/367,984

(22) Filed: Mar. 28, 2019

(65) Prior Publication Data

US 2019/0339759 A1 Nov. 7, 2019

(30) Foreign Application Priority Data

May 3, 2018 (KR) .................. 10-2018-0051389
Oct. 30, 2018 (KR) .................. 10-2018-0130844

(51) Int. Cl.
*G06F 1/26* (2006.01)
*H01R 13/04* (2006.01)

(52) U.S. Cl.
CPC ............ *G06F 1/266* (2013.01); *H01R 13/04* (2013.01)

(58) Field of Classification Search
None
See application file for complete search history.

(56) References Cited

U.S. PATENT DOCUMENTS

| | | | |
|---|---|---|---|
| 6,718,416 B1 * | 4/2004 | Self ..................... | G06F 13/4081 710/300 |
| 7,607,936 B2 | 10/2009 | Mizoguchi et al. | |
| 9,367,508 B2 | 6/2016 | Otsuka | |
| 9,552,318 B2 | 1/2017 | Shin et al. | |
| 2006/0284491 A1 * | 12/2006 | Kuo ......................... | G06F 1/26 307/116 |
| 2008/0257960 A1 * | 10/2008 | Jin ....................... | G06K 7/0008 235/441 |
| 2009/0061935 A1 | 3/2009 | Lee et al. | |
| 2011/0267135 A1 * | 11/2011 | Chen ....................... | G06F 1/266 327/518 |
| 2013/0058037 A1 * | 3/2013 | Brandyberry ............. | G06F 1/20 361/679.46 |
| 2013/0113532 A1 * | 5/2013 | Lee ........................... | G06F 1/30 327/143 |

(Continued)

*Primary Examiner* — Danny Chan
(74) *Attorney, Agent, or Firm* — Myers Bigel, P.A.

(57) ABSTRACT

Host interface devices are provided. A host interface device includes a first pin connected to a first node and a second pin connected to a second node. The host interface device includes a switch connected between the second node and a first voltage terminal, and configured to provide a voltage from the first voltage terminal to the second pin in response to a voltage level of the first node. The host interface device includes a pull-up resistor connected between the first node and a second voltage terminal. Moreover, the host interface device is configured to receive a memory detection signal from a storage device via the first pin when the first pin is electrically connected to the storage device.

16 Claims, 10 Drawing Sheets

(56) References Cited

U.S. PATENT DOCUMENTS

| | | | |
|---|---|---|---|
| 2014/0176790 A1* | 6/2014 | Shen | H04N 5/23241 |
| | | | 348/372 |
| 2016/0327602 A1 | 11/2016 | Subramanian et al. | |
| 2017/0090957 A1* | 3/2017 | Sadowski | G06F 9/3869 |
| 2017/0133930 A1* | 5/2017 | Chen | G05F 1/56 |
| 2017/0206974 A1* | 7/2017 | Kong | G06F 3/0625 |
| 2018/0032350 A1* | 2/2018 | Lee | G06F 1/266 |
| 2018/0113776 A1 | 4/2018 | Lee et al. | |
| 2018/0239696 A1 | 8/2018 | Lim et al. | |
| 2019/0245291 A1* | 8/2019 | Wang | G11C 16/30 |
| 2020/0233823 A1* | 7/2020 | Zhang | G06F 13/4081 |

* cited by examiner

CONNECTORS THAT CONNECT A STORAGE DEVICE AND POWER SUPPLY CONTROL DEVICE, AND RELATED POWER SUPPLY CONTROL DEVICES AND HOST INTERFACE DEVICES

CROSS-REFERENCE TO RELATED APPLICATIONS

This application claims priority under 35 U.S.C. § 119 to Korean Patent Application Nos. 10-2018-0051389 filed on May 3, 2018 and 10-2018-0130844 filed on Oct. 30, 2018, in the Korean Intellectual Property Office, the disclosures of which are incorporated by reference herein in their entireties.

BACKGROUND

The present disclosure relates to a host interface and, more particularly, to a host interface device controlling power which is supplied from a host to a storage device. A solid state drive (SSD) is a kind of storage device. The SSD may be connected with a host, such as a desktop computer, a notebook computer, a laptop computer, a tablet computer, a smartphone, or a server, for the purpose of inputting and outputting data. The SSD may be connected with the host through a connector (or a slot). A standard of the connector to connect the SSD and the host may vary with a type of the SSD. That is, a connector on which the SSD may be mounted may be determined according to a type of the SSD. For example, an M.2 SSD may be mounted on a connector suitable for the M.2 standard and may be connected with the host.

Demand has increased for data centers for storing various data. As such, an SSD of a new form factor is being developed to store a large amount of data at a data center having restricted space. A new standard of a connector may be used to connect the SSD of the new form factor with the host. In the case where the SSD of the new form factor is mounted on a connector complying with a conventional standard or a conventional SSD is mounted on a connector complying with a new standard, the SSD may be damaged due to the abnormal supply of a power. For example, in the case where the SSD of a conventional M.2 standard is mounted on a connector complying with a new standard, the M.2 SSD may be damaged due to the abnormal supply of the power from the host.

SUMMARY

Embodiments of the inventive concepts provide a host interface device which may prevent/inhibit damage of a storage device due to an abnormal supply of a power when a storage device of a different standard is mounted on a connector.

Embodiments of the inventive concepts provide a host interface device which may supply a power quickly to a storage device of a new form-factor.

According to example embodiments, a host interface device may include a first pin connected to a first node. The host interface device may include a second pin connected to a second node. The host interface device may include a switch connected between the second node and a first voltage terminal. The switch may be configured to provide a voltage from the first voltage terminal to the second pin in response to a voltage level of the first node. The host interface device may include a pull-up resistor connected between the first node and a second voltage terminal. Moreover, the host interface device may be configured to receive a memory detection signal from a storage device via the first pin when the first pin is electrically connected to the storage device.

According to example embodiments, a power supply control device that is electrically connectable to a storage device through a plurality of pins of a connector is provided. The power supply control device may include a first memory detection circuit configured to output a first output signal at a first level in response to detecting that the storage device is not connected to the connector, and to output the first output signal at a second level in response to a first memory detection signal transmitted through a first pin of the plurality of pins from the storage device when the storage device is connected to the connector. The power supply control device may include a second memory detection circuit configured to output a second output signal at the first level in response to detecting that the storage device is not connected to the connector, and to output the second output signal at the second level in response to a second memory detection signal transmitted through a second pin of the plurality of pins from the storage device when the storage device is connected to the connector. Moreover, the power supply control device may include a voltage supply circuit configured to block a supply of a voltage in response to the first output signal being at the first level, and to supply the voltage to the storage device in response to the first output signal being at the second level.

According to example embodiments, a connector that electrically connects a storage device and a power supply control device is provided. The connector may include a memory detection pin through which the power supply control device is configured to receive a memory detection signal from the storage device when the storage device is connected to the connector. Moreover, the connector may include a voltage pin through which the power supply control device is configured to supply a voltage to the storage device in response to the memory detection signal. A length of the memory detection pin may be a longest length of a plurality of lengths of a plurality of pins included in the connector.

BRIEF DESCRIPTION OF THE FIGURES

The above and other objects and features of the inventive concepts will become apparent by describing in detail example embodiments thereof with reference to the accompanying drawings.

DETAILED DESCRIPTION

Below, example embodiments of the inventive concepts are described in detail.

Figure 1:
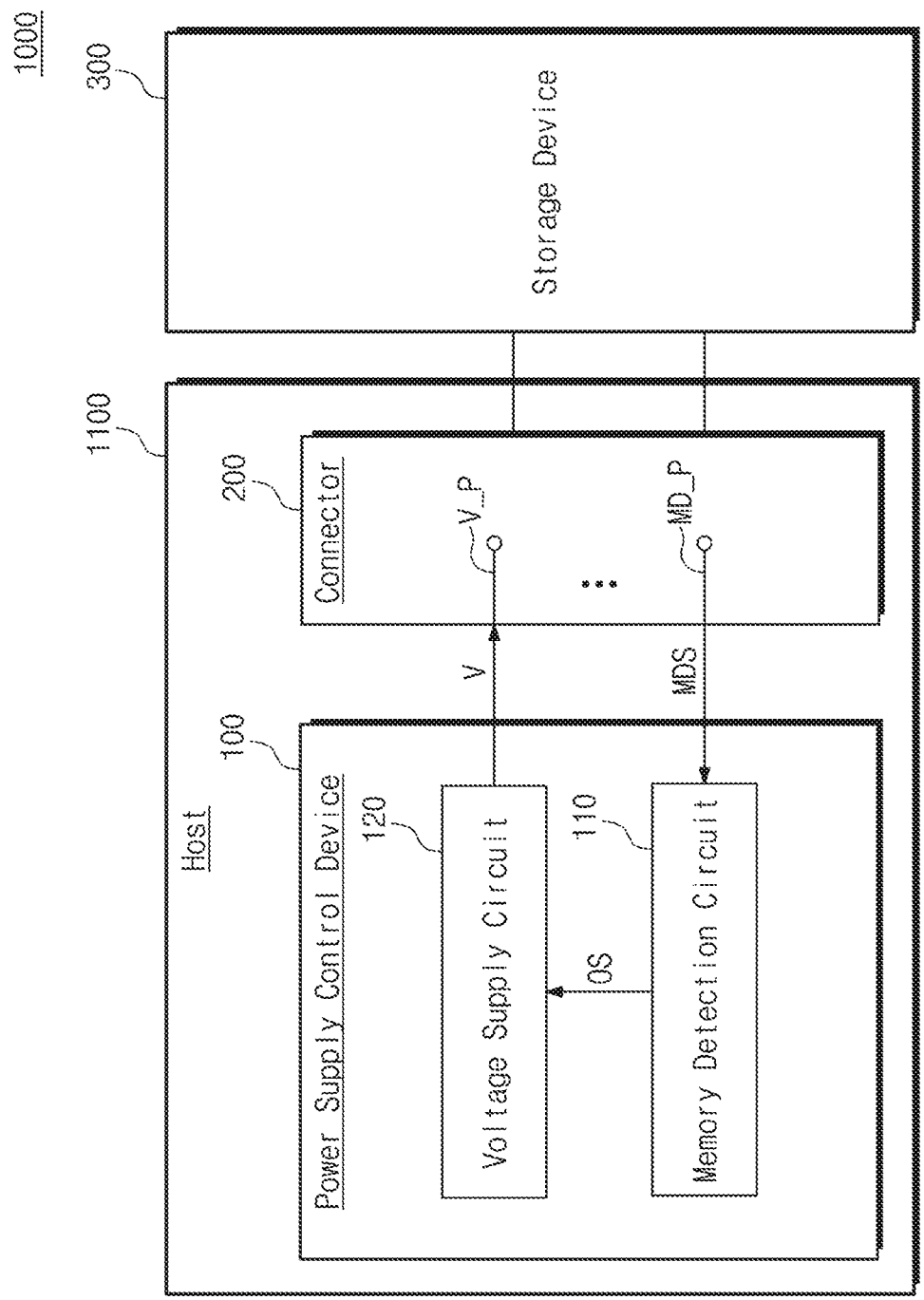
FIG. 1 is a block diagram illustrating a storage system according to some embodiments of the inventive concepts.

FIG. 1 is a block diagram illustrating a storage system according to some embodiments of the inventive concepts. Referring to FIG. 1, a storage system 1000 may include a power supply control device 100, a connector 200, and a storage device 300. Each of the power supply control device 100 and the connector 200 may be one of a plurality of devices included in a host 1100. For example, the power supply control device 100 and the connector 200 may be devices mounted on a motherboard of a server. The storage device 300 may be mounted on the connector 200. As such, the storage device 300 may be electrically connected with the power supply control device 100 through the connector 200.

The power supply control device 100 may provide signals associated with an operation of the storage device 300 to the storage device 300 through the connector 200. For example, the power supply control device 100 may supply a voltage "V" to the storage device 300 through the connector 200. The power supply control device 100 may be implemented in the form of a package or chip which includes circuits performing various functions. However, the inventive concepts are not limited thereto. For example, the power supply control device 100 may be implemented in the form of hardware, software, or a combination thereof.

The connector 200 may include a plurality of pins V_P to MD_P. The plurality of pins V_P to MD_P may be connected with signal lines of the power supply control device 100. For example, the pin V_P may be connected with a signal line providing a voltage "V" of the power supply control device 100.

When the storage device 300 is mounted on the connector 200, the plurality of pins V_P to MD_P may be used to transmit signals provided from the power supply control device 100 to the storage device 300. Additionally or alternatively, the plurality of pins V_P to MD_P may be used to transmit signals provided from the storage device 300 to the power supply control device 100.

The present inventive concepts are not limited to mounting a storage device on a connector. Rather, any operation and/or configuration described herein with respect to mounting a storage device may more broadly be implemented when the storage device is on and/or electrically connected to (but not necessarily mounted on) a connector.

The storage device 300 may be mounted on (or otherwise on/connected to) the connector 200 by using edge pins (e.g., a goldfinger). When the storage device 300 is mounted on the connector 200, the plurality of pins V_P to MD_P may contact pins of the storage device 300. As such, the power supply control device 100 and the storage device 300 may be electrically connected.

When the storage device 300 is mounted on the connector 200, through the plurality of pins V_P to MD_P, the storage device 300 may receive signals from the power supply control device 100 and may provide signals to the power supply control device 100. For example, the storage device 300 may receive data from the power supply control device 100 and may store the received data. The storage device 300 may provide the stored data to the power supply control device 100.

The storage device 300 may be a storage device having a particular standard among storage devices of various standards. For example, the storage device 300 may be an SSD having a small form factor (SFF). However, the inventive concepts are not limited thereto. For example, the storage device 300 may include an SSD having various standards such as a next generation small form factor (NGSFF).

The power supply control device 100 may include a memory detection circuit 110 and a voltage supply circuit 120. The memory detection circuit 110 may receive a memory detection signal MDS from the storage device 300. In response to the power supply control device 100 and the storage device 300 being connected, such as by the storage device 300 being mounted on the connector 200, the memory detection circuit 110 may receive the memory detection signal MDS. By receiving the memory detection signal MDS, the memory detection circuit 110 may detect that the storage device 300 of a particular standard is mounted. The memory detection circuit 110 may receive the memory detection signal MDS through the memory detection pin MD_P.

When the storage device 300 is not mounted on the connector 200, the memory detection circuit 110 may fail to receive the memory detection signal MDS. Moreover, when a storage device of a different standard from the storage device 300 is mounted on the connector 200, the memory detection circuit 110 may fail to receive the memory detection signal MDS. For example, when the storage device of the different standard is mounted on the connector 200, the memory detection pin MD_P may not be connected with any pin of the storage device. Alternatively, a pin of the storage device, which is connected with the memory detection pin MD_P, may be at an opened state. In this case, the memory detection signal MDS may not be transmitted through the memory detection pin MD_P. When the storage device 300 of the particular standard is mounted, the memory detection circuit 110 may receive the memory detection signal MDS.

In some embodiments, receipt of the memory detection signal MDS may mean that a voltage level of the memory detection pin MD_P has become a particular level. The absence of receipt of the memory detection signal MDS, on the other hand, may mean that a voltage level of the memory detection pin MD_P has become a level different from the particular level.

The memory detection circuit 110 may output an output signal OS. In some embodiments, in response to detecting that the storage device 300 is not mounted, the memory detection circuit 110 may output the output signal OS at a first level. In response to detecting that the storage device 300 is mounted, the memory detection circuit 110 may output the output signal OS at a second level, based on the memory detection signal MDS. For example, in response to detecting that the storage device 300 is not mounted, the memory detection circuit 110 may output the output signal OS having a logical high value. In response to detecting that the storage device 300 is mounted, the memory detection circuit 110 may output the output signal OS having a logical low value. In some embodiments, the memory detection signal MDS may be a signal having a logical low value.

The voltage supply circuit 120 may receive the output signal OS. Depending on a level of the output signal OS, the voltage supply circuit 120 may output the voltage "V" or may block an output of the voltage "V". In some embodiments, the voltage supply circuit 120 may block (i.e., may not output) the voltage "V" in response to the output signal OS at the first level. The voltage supply circuit 120 may output the voltage "V" in response to the output signal OS of the second level. That is, the voltage supply circuit 120 may output the voltage "V" when it is determined that the storage device 300 is connected (e.g., mounted) and may block the output of the voltage "V" when it is determined that the storage device 300 is not connected (e.g., not mounted).

The output voltage "V" may be provided to the storage device 300 through the voltage pin V_P. An example is illustrated in FIG. 1 in which the voltage "V" is provided to the storage device 300 through one signal line (i.e., one voltage pin V_P), but the inventive concepts are not limited thereto. The voltage supply circuit 120 may provide the voltage "V" through a plurality of signal lines (i.e., a plurality of voltage pins V_P). In some embodiments, the same voltage "V" or different voltages "V" may be provided to the plurality of signal lines.

In response to the output voltage "V" being provided to the storage device 300, the storage device 300 may start an operation. For example, the storage device 300 may set an interface for data communication by performing an initialization operation. By using the voltage "V", the storage device 300 may store data provided from the host 1100 or may provide the stored data to the host 1100.

As described above, when the storage device 300 of the particular standard is mounted, the power supply control device 100 may detect a connection of the storage device 300 and may provide the voltage "V" to the storage device 300. In response to detecting that a storage device of a different standard from the storage device 300 is mounted, the power supply control device 100 may block the supply of the voltage "V". If the voltage "V" were instead supplied to the storage device of the different standard, a signal line of the storage device, to which the voltage "V" is supplied, may be connected with a ground terminal. As a result, an over-current may flow to the signal line to which the voltage "V" is supplied, and thus, the storage device may be damaged. The power supply control device 100 may thus prevent/protect the storage device of the different standard from being damaged, by blocking the supply of the voltage "V".

Figure 2:
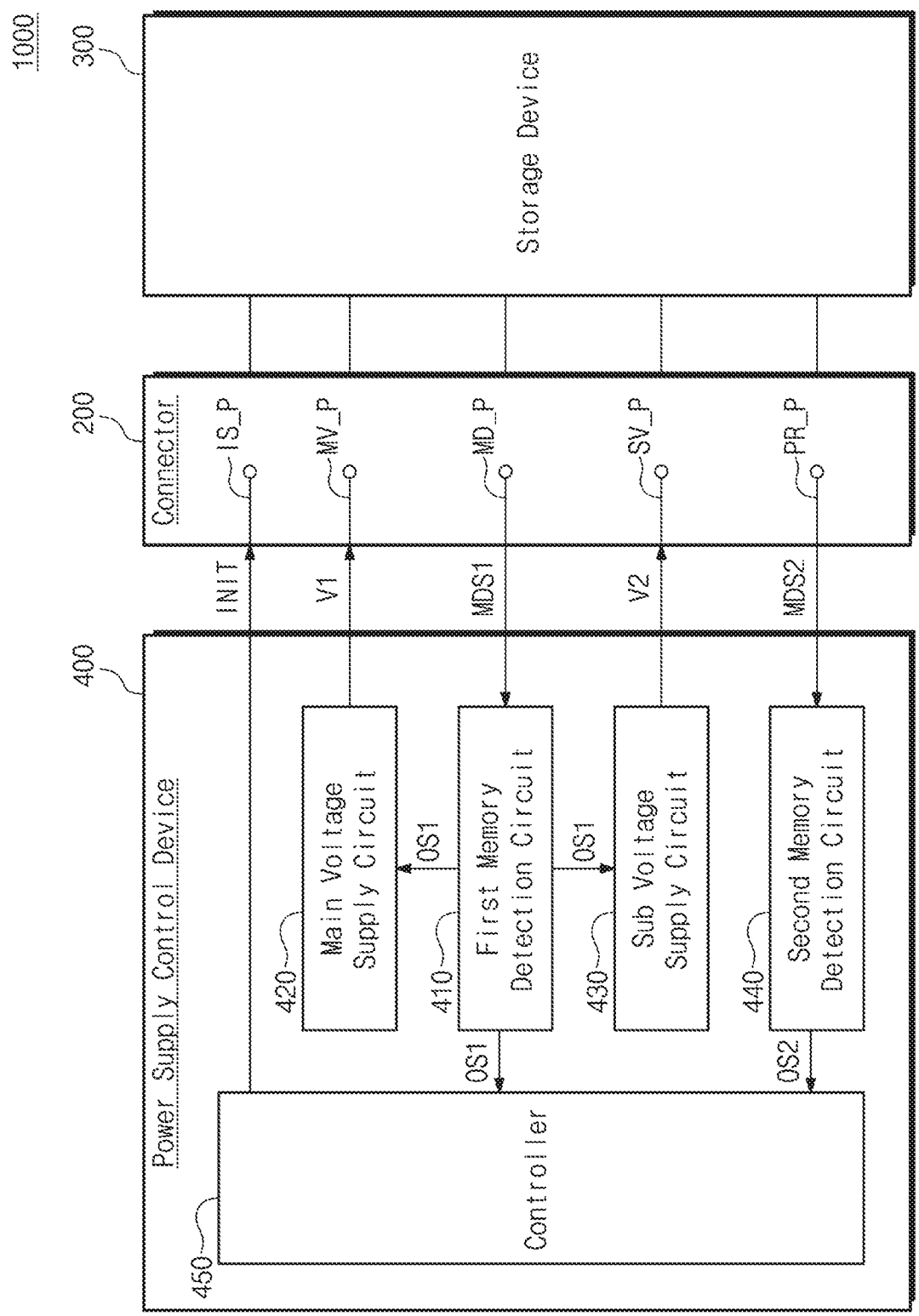
FIG. 2 is a block diagram illustrating a storage system of FIG. 1 in detail.

FIG. 2 is a block diagram illustrating a storage system of FIG. 1 in detail. Referring to FIG. 2, the storage system 1000 may include the connector 200, the storage device 300, and a power supply control device 400. Operations of the connector 200 and the storage device 300 of FIG. 2 are substantially identical or similar to the operations of the connector 200 and the storage device 300 of FIG. 1, and thus, redundant descriptions may be omitted.

The connector 200 may include an input signal pin IS_P, a main voltage pin MV_P, a memory detection pin MD_P, a sub voltage pin SV_P, and a present pin PR_P.

The power supply control device 400 may include a first memory detection circuit 410, a main voltage supply circuit 420, a sub voltage supply circuit 430, a second memory detection circuit 440, and a controller 450.

The first memory detection circuit 410 may receive a first memory detection signal MDS1 depending on a connection state of the power supply control device 400 and the storage device 300. When the power supply control device 400 and the storage device 300 are not connected, the first memory detection circuit 410 may fail to receive the first memory detection signal MDS1. When the power supply control device 400 and the storage device 300 are connected, the first memory detection circuit 410 may receive the first memory detection signal MDS1 from the storage device 300 through the memory detection pin MD_P.

The first memory detection circuit 410 may output a first output signal OS1. The first output signal OS1 may be provided to the main voltage supply circuit 420, the sub voltage supply circuit 430, and the controller 450. A level of the first output signal OS1 may change depending on whether the first memory detection signal MDS1 is received. In response to detecting that the first memory detection signal MDS1 is not received, the first memory detection circuit 410 may output the first output signal OS1 at the first level. In response to detecting that the first memory detection signal MDS1 is received, the first memory detection circuit 410 may output the first output signal OS1 at the second level. If the first memory detection signal MDS1 is received, a level of the first output signal OS1 may be identical to a level of the first memory detection signal MDS1. For example, responsive to not receiving the first memory detection signal MDS1, the first output signal OS1 at a high level may be output, whereas responsive to receiving the first memory detection signal MDS1 at a low level, the first output signal OS1 at a low level may be output.

That is, the first memory detection circuit 410 may determine whether the power supply control device 400 and the storage device 300 are connected, based on the first memory detection signal MDS1. The first memory detection circuit 410 may output the first output signal OS1 at a different level depending on a connection state of the power supply control device 400 and the storage device 300.

The main voltage supply circuit 420 may receive the first output signal OS1. Depending on a level of the first output signal OS1, the main voltage supply circuit 420 may output a first voltage V1 or may block an output of the first voltage V1. In response to receiving the first output signal OS1 at a first level, the main voltage supply circuit 420 may block the output of the first voltage V1. In response to receiving the first output signal OS1 at a second level, the main voltage supply circuit 420 may output the first voltage V1. The first voltage V1 thus output may be provided to the storage device 300 through the main voltage pin MV_P.

That is, in response to detecting that the power supply control device 400 and the storage device 300 are not connected, the main voltage supply circuit 420 may block (i.e., refrain from) the supply of the first voltage V1. In response to detecting that the power supply control device 400 and the storage device 300 are connected, the main voltage supply circuit 420 may supply the first voltage V1.

The first voltage V1 may be a voltage necessary/sufficient for the storage device 300 to operate. In some embodiments, the storage device 300 may operate internal circuits based on the first voltage V1. Based on the first voltage V1, the storage device 300 may store data or may output the stored data. For example, the first voltage V1 may be, but is not limited to, 12 Volts (V).

The sub voltage supply circuit 430 may receive the first output signal OS1. Depending on a level of the first output signal OS1, the sub voltage supply circuit 430 may output a second voltage V2 or may block an output of the second voltage V2. In response to receiving the first output signal OS1 at the first level, the sub voltage supply circuit 430 may block the output of the second voltage V2. In response to receiving the first output signal OS1 at the second level, the sub voltage supply circuit 430 may output the second voltage V2. The second voltage V2 thus output may be provided to the storage device 300 through the sub voltage pin SV_P.

That is, in response to detecting that the power supply control device 400 and the storage device 300 are not connected, the sub voltage supply circuit 430 may block the supply of the second voltage V2. In response to detecting that the power supply control device 400 and the storage device 300 are connected, the sub voltage supply circuit 430 may supply the second voltage V2.

The second voltage V2 may be a voltage necessary/sufficient for the storage device 300 to operate in a special/particular situation. In some embodiments, in response to the supply of the first voltage V1 to the storage device 300 being blocked, the storage device 300 may communicate with the power supply control device 400 based on the second voltage V2. That is, the storage device 300 may communicate with the power supply control device 400 through a side-band. For example, the second voltage V2 may be, but is not limited to, 3.3 V.

The second memory detection circuit 440 may receive a second memory detection signal MDS2 depending on a connection state of the power supply control device 400 and the storage device 300. When the power supply control device 400 and the storage device 300 are not connected, the second memory detection circuit 440 may fail to receive the second memory detection signal MDS2. When the power supply control device 400 and the storage device 300 are connected, the second memory detection circuit 440 may receive the second memory detection signal MDS2 from the storage device 300 through the present pin PR_P. As such, a pin (i.e., the memory detection pin MD_P) to which the first memory detection signal MD_S1 is transmitted may be different from a pin (i.e., the present pin PR_P) to which the second memory detection signal MDS2 is transmitted.

The second memory detection signal MDS2 may be received later than the first memory detection signal MDS1. For example, a time when the present pin PR_P is connected with a pin of the storage device 300 may be later than a time when the memory detection pin MD_P is connected with a pin of the storage device 300. Accordingly, the second memory detection signal MDS2 may be provided later than the first memory detection signal MDS1.

The second memory detection circuit 440 may output a second output signal OS2. The second output signal OS2 may be provided to the controller 450. A level of the second output signal OS2 may change depending on whether the second memory detection signal MDS2 is received. In response to not receiving the second memory detection signal MDS2, the second memory detection circuit 440 may output the second output signal OS2 at the first level. In response to receiving the second memory detection signal MDS2, the second memory detection circuit 440 may output the second output signal OS2 at the second level. If the second memory detection signal MDS2 is received, a level of the second output signal OS2 may be identical to a level of the second memory detection signal MDS2. For example, if the second memory detection signal MDS2 is not received, the second output signal OS2 at the high level may be output, whereas if the second memory detection signal MDS2 at the low level is received, the second output signal OS2 at the low level may be output.

That is, the second memory detection circuit 440 may determine whether the power supply control device 400 and the storage device 300 are connected, based on the second memory detection signal MDS2. Since the second memory detection signal MDS2 is received later than the first memory detection signal MDS1, the second memory detection circuit 440 may detect a connection of the power supply control device 400 and the storage device 300 later than the first memory detection circuit 410. Accordingly, a time when a level of the second output signal OS2 changes may be later than a time when a level of the first output signal OS1 changes.

The controller 450 may receive the first output signal OS1 and the second output signal OS2. The controller 450 may provide an initialization signal INIT to the storage device 300 in response to a level change of the second output signal OS2. In response to the second output signal OS2 changing from the first level to the second level, the controller 450 may provide the initialization signal INIT to the storage device 300 through the input signal pin IS_P. When the storage device 300 is connected with the power supply control device 400, the controller 450 may initialize the storage device 300 through the initialization signal INIT.

Since the first memory detection signal MDS1 may be received prior to the second memory detection signal MDS2, a time when a level change of the first output signal OS1 is detected may be earlier than a time when a level change of the second output signal OS2 is detected. If the controller 450 provides the initialization signal INIT based on the level change of the first output signal OS1, the initialization signal INIT may be provided before the first voltage V1 and the second voltage V2 are provided to the storage device 300. As a result, the initialization operation of the storage device 300 may not be performed normally.

In contrast, if the controller 450 provides the initialization signal INIT based on the level change of the second output signal OS2, the initialization signal INIT may be provided after the first voltage V1 and the second voltage V2 are provided to the storage device 300. As a result, the initialization operation of the storage device 300 may be performed normally.

However, the inventive concepts are not limited thereto. For example, the controller 450 may provide the initialization signal INIT based on the level change of the first output signal OS1. In some embodiments, the controller 450 may provide the initialization signal INIT after a preset/predetermined time with respect to a time when the level change of the first output signal OS1 is detected.

The storage device 300 may perform the initialization operation in response to the initialization signal INIT. For example, the storage device 300 may set an interface standard (e.g., SATA or PCIe) and a bandwidth for the purpose of communicating with the power supply control device 400. The power supply control device 400 and the storage device 300 may convey data through relevant pins depending on the set interface standard and bandwidth.

As described above, the power supply control device 400 may include the two memory detection circuits 410 and 440. The power supply control device 400 may supply the voltages V1 and V2 to the storage device 300 by using the first memory detection circuit 410 and may initialize the storage device 300 by using the second memory detection circuit 440. Since the first memory detection signal MDS1 is received faster than the second memory detection signal MD S2, the power supply control device 400 may initialize the storage device 300 after supplying power to the storage device 300.

The components of the power supply control device 400 described with reference to FIG. 2 may be implemented in the form of software, hardware, or a combination thereof.

For example, the software may include machine code, firmware, embedded code, and/or application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Figure 3:
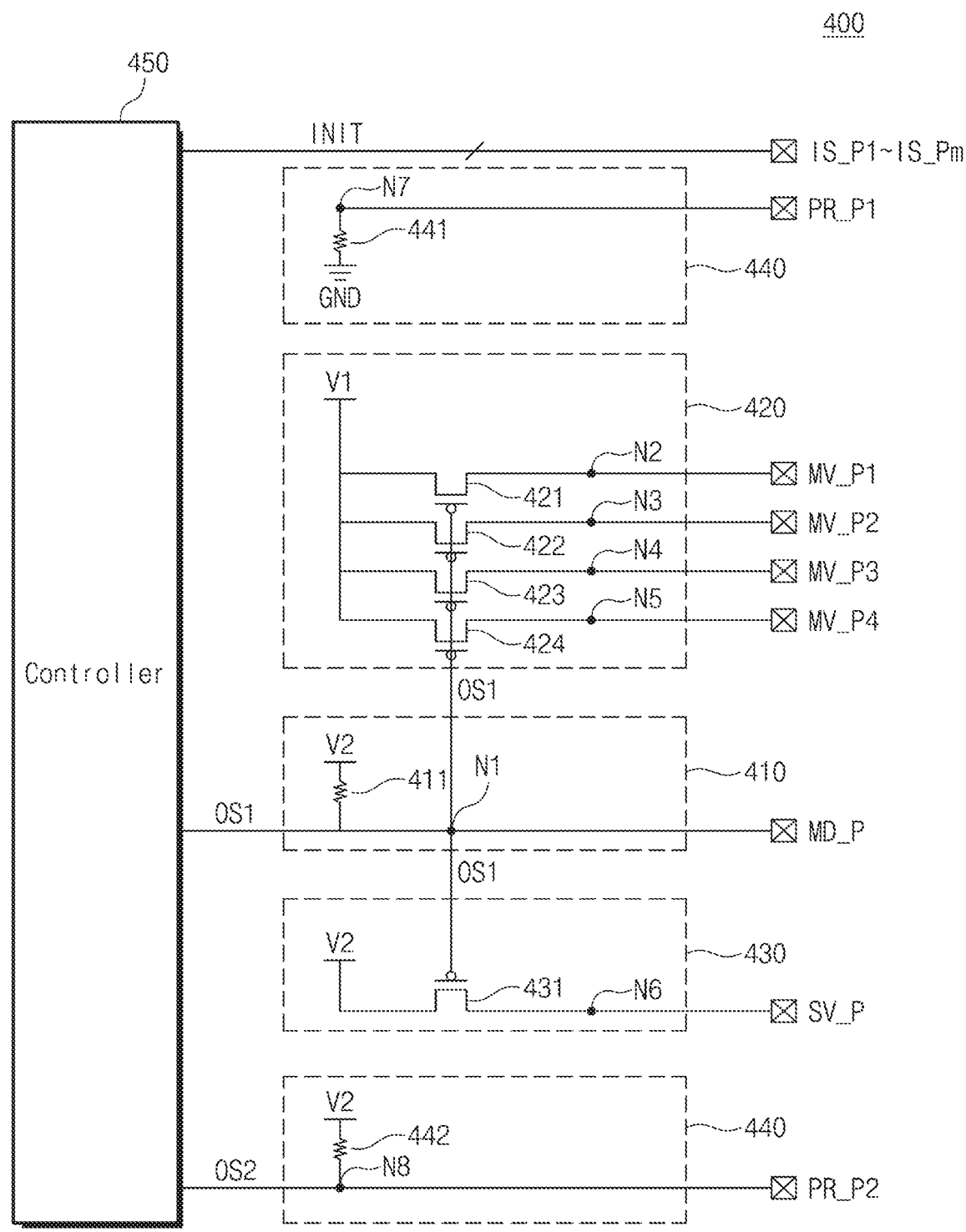
FIG. 3 is a circuit diagram illustrating one example of a power supply control device of FIG. 2.

FIG. 3 is a circuit diagram illustrating one example of a power supply control device of FIG. 2. Referring to FIG. 3, the power supply control device 400 may include the first memory detection circuit 410, the main voltage supply circuit 420, the sub voltage supply circuit 430, the second memory detection circuit 440, and the controller 450.

The first memory detection circuit 410 may include a pull-up resistor 411. A first end of the pull-up resistor 411 may be connected with a terminal (hereinafter referred to as a "V2 terminal") to which the second voltage V2 is supplied, and a second end of the pull-up resistor 411 may be connected with a first node N1. The first node N1 may be connected with the memory detection pin MD_P of the connector 200. For example, the second voltage V2 may be 3.3 V.

The first node N1 may be directly connected with output terminals of the first memory detection circuit 410. Accordingly, a level of the first output signal OS1 which is output from the first memory detection circuit 410 may be determined according to a level of the first node N1. If the first node N1 is at the first level, the first output signal OS1 may have the first level. If the first node N1 is at the second level, the first output signal OS1 may have the second level.

The main voltage supply circuit 420 may include first to fourth main switches 421 to 424. For example, the main switches 421 to 424 may be implemented with a p-channel MOSFET (hereinafter referred to as a "PMOS transistor"). However, the inventive concepts are not limited thereto. For example, the main switches 421 to 424 may be implemented with various types of transistors.

First ends of the main switches 421 to 424 may be connected with a terminal (hereinafter referred to as a "V1 terminal") to which the first voltage V1 is supplied, and second ends thereof may be respectively connected with second to fifth nodes N2 to N5. The second to fifth nodes N2 to N5 may be respectively connected with first to fourth main voltage pins MV_P1 to MV_P4. Gates of the main switches 421 to 424 may be connected with an output terminal (i.e., the first node N1) of the first memory detection circuit 410.

The main switches 421 to 424 may be closed or opened according to a level of the first output signal OS1. When the main switches 421 to 424 are in an open state, the supply of the first voltage V1 to the main voltage pins MV_P1 to MV_P4 may be blocked. When the main switches 421 to 424 are in a closed state, the first voltage V1 may be supplied to the main voltage pins MV_P1 to MV_P4. For example, in response to the first output signal OS1 being at the first level (e.g., logical high), the main switches 421 to 424 may be opened. In response to the first output signal OS1 being at the second level (e.g., logical low), the main switches 421 to 424 may be closed.

As illustrated in FIG. 3, the main voltage supply circuit 420 may supply the first voltage V1 through the four pins MV_P1 to MV_P4, but the inventive concepts are not limited thereto. For example, the main voltage supply circuit 420 may supply the first voltage V1 through a varying number of pins.

The sub voltage supply circuit 430 may include a side switch 431. For example, the side switch 431 may be implemented with a PMOS transistor. However, the inventive concepts are not limited thereto. For example, the side switch 431 may be implemented with various types of transistors.

A first end of the side switch 431 may be connected with the V2 terminal, and a second end of the side switch 431 may be connected with a sixth node N6. The sixth node N6 may be connected with the sub voltage pin SV_P. A gate of the side switch 431 may be connected with an output terminal (i.e., the first node N1) of the first memory detection circuit 410.

The side switch 431 may be closed or opened according to a level of the first output signal OS1. When the side switch 431 is opened, the supply of the second voltage V2 to the sub voltage pin SV_P may be blocked. When the side switch 431 is closed, the second voltage V2 may be supplied to the sub voltage pin SV_P. For example, in response to the first output signal OS1 being at the first level (e.g., logical high), the side switch 431 may be opened. In response to the first output signal OS1 being at the second level (e.g., logical low), the side switch 431 may be closed.

As illustrated in FIG. 3, the sub voltage supply circuit 430 may supply the second voltage V2 through the one pin SV_P, but the inventive concepts are not limited thereto. For example, the sub voltage supply circuit 430 may supply the second voltage V2 through a varying number of pins.

The second memory detection circuit 440 may include a first detection resistor 441 and a second detection resistor 442. A first end of the first detection resistor 441 may be connected with a ground terminal GND, and a second end thereof may be connected with a seventh node N7. The seventh node N7 may be connected with a first present pin PR_P1. A first end of the second detection resistor 442 may be connected with the V2 terminal, and a second end thereof may be connected with an eighth node N8. The eighth node N8 may be connected with a second present pin PR_P2. For example, the second voltage V2 may be 3.3 V.

The eighth node N8 may be directly connected with an output terminal of the second memory detection circuit 440. Accordingly, a level of the second output signal OS2 which is output from the second memory detection circuit 440 may be determined according to a level of the eighth node N8. When the eighth node N8 is at the first level, the second output signal OS2 may have the first level. When the eighth node N8 is at the second level, the second output signal OS2 may have the second level.

The controller 450 may provide the initialization signal INIT necessary/used for an initialization operation of the storage device 300 through first to m-th input signal pins IS_P1 to IS_Pm. However, the inventive concepts are not limited thereto. For example, the controller 450 may provide the initialization signal INIT to the storage device 300 by using a varying number of pins.

Below, an operation of the power supply control device 400 will be described with reference to FIGS. 4 to 7.

Figure 4:
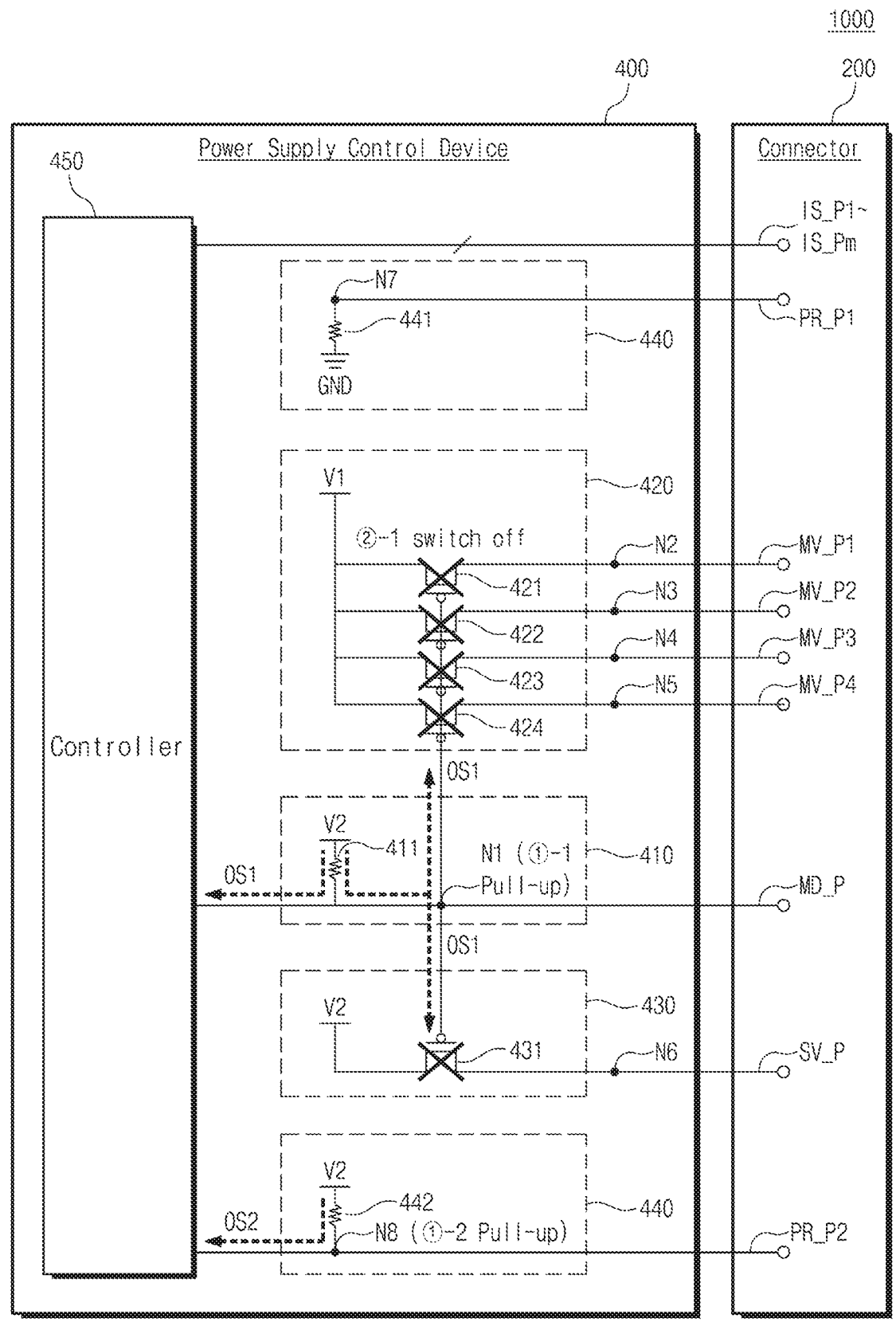
FIG. 4 is a diagram illustrating an example of an operation of a power supply control device of FIG. 3, in the case where no storage device is mounted on a connector.

FIG. 4 is a diagram illustrating an example of an operation of a power supply control device of FIG. 3, in the case where no storage device is mounted on a connector.

In response to detecting that no storage device is mounted on (or otherwise on/connected to) the connector 200, the pull-up resistor 411 may pull up the first node N1 to the first level by using the second voltage V2 (①-1). For example, the first level may be the second voltage V2. As a result, the first output signal OS1 at the first level may be output from the first memory detection circuit 410.

The main switches 421 to 424 and the side switch 431 may be opened in response to the first output signal OS1 of the first level (②-1). As such, the supply of the first voltage V1 to the first to fourth main voltage pins MV_P1 to MV_P4 may be blocked, and the supply of the second voltage V2 to the sub voltage pin SV_P may be blocked.

In response to detecting that no storage device is mounted on the connector 200, the second detection resistor 442 may pull up the eighth node N8 to the first level by using the second voltage V2 (①-2). For example, the first level may be the second voltage V2. As a result, the second output signal OS2 at the first level may be output from the second memory detection circuit 440.

In response to receiving the first output signal OS1 at the first level or the second output signal OS2 at the first level, the controller 450 may maintain a standby state. That is, the controller 450 may not provide a signal (e.g., the initialization signal INIT) through the first to m-th input signal pins IS_P1 to IS_Pm.

Figure 5:
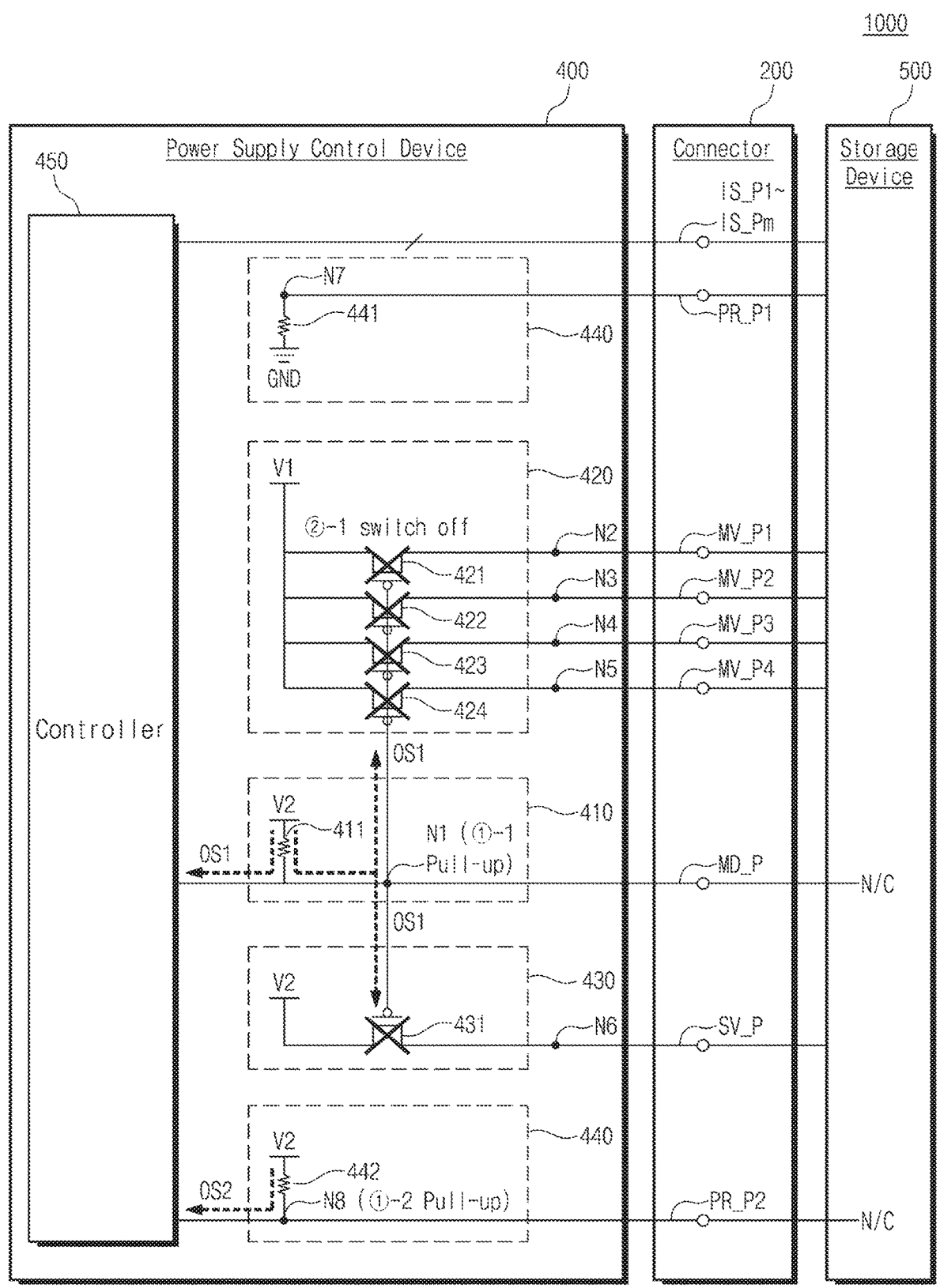
FIG. 5 is a diagram illustrating an example of an operation of a power supply control device of FIG. 3, in the case where a storage device of a different standard from a storage device of FIG. 1 is mounted on a connector.

FIG. 5 is a diagram illustrating an example of an operation of a power supply control device of FIG. 3, in the case where a storage device of a different standard from a storage device of FIG. 1 is mounted on a connector. Referring to FIG. 5, a storage device 500 may have a different standard (i.e., a different form factor) from the storage device 300 of FIGS. 1 and 2.

When the storage device 500 is mounted on the connector 200, the memory detection pin MD_P may not be connected with any pin of the storage device 500, or a pin or signal line of the storage device 500, which is connected with the memory detection pin MD_P, may be opened (i.e., the pin or signal line of the storage device 500 may not be connected with a particular circuit or a particular terminal). As such, the first node N1 may maintain a state in which the first node N1 is pulled up to the first level by the second voltage V2 (①-1). As a result, the first output signal OS1 at the first level may be output from the first memory detection circuit 410.

The main switches 421 to 424 and the side switch 431 may be opened in response to the first output signal OS1 of the first level (②-1). As such, the supply of the first voltage V1 to the first to fourth main voltage pins MV_P1 to MV_P4 may be blocked, and the supply of the second voltage V2 to the sub voltage pin SV_P may be blocked.

When the storage device 500 is mounted on the connector 200, a pin or signal line of the storage device 500, which is connected with the second present pin PR_P2, may be opened. As such, the eighth node N8 may maintain a state in which the eighth node N8 is pulled up to the first level by the second voltage V2 (①-2). As a result, the second output signal OS2 of the first level may be output from the second memory detection circuit 440.

In response to receiving the first output signal OS1 at the first level or the second output signal OS2 at the first level, the controller 450 may maintain a standby state. That is, the controller 450 may not provide a signal (e.g., the initialization signal INIT) to the storage device 500 through the first to m-th input signal pins IS_P1 to IS_Pm.

As described above, in response to detecting that the storage device 500 of a different standard from the storage device 300 is mounted on the connector 200, the power supply control device 400 may not supply any voltage to the storage device 500. When the standard of the storage device 500 is different from a standard supported by the power supply control device 400, one of a plurality of pins to which a voltage is supplied may be directly connected with a ground terminal. As a result, an over-current may flow to the storage device 500, thereby causing a damage of the storage device 500. As such, the power supply control device 400 may prevent/inhibit damage of the storage device 500 by blocking the supply of a voltage to the storage device 500.

Figure 6:
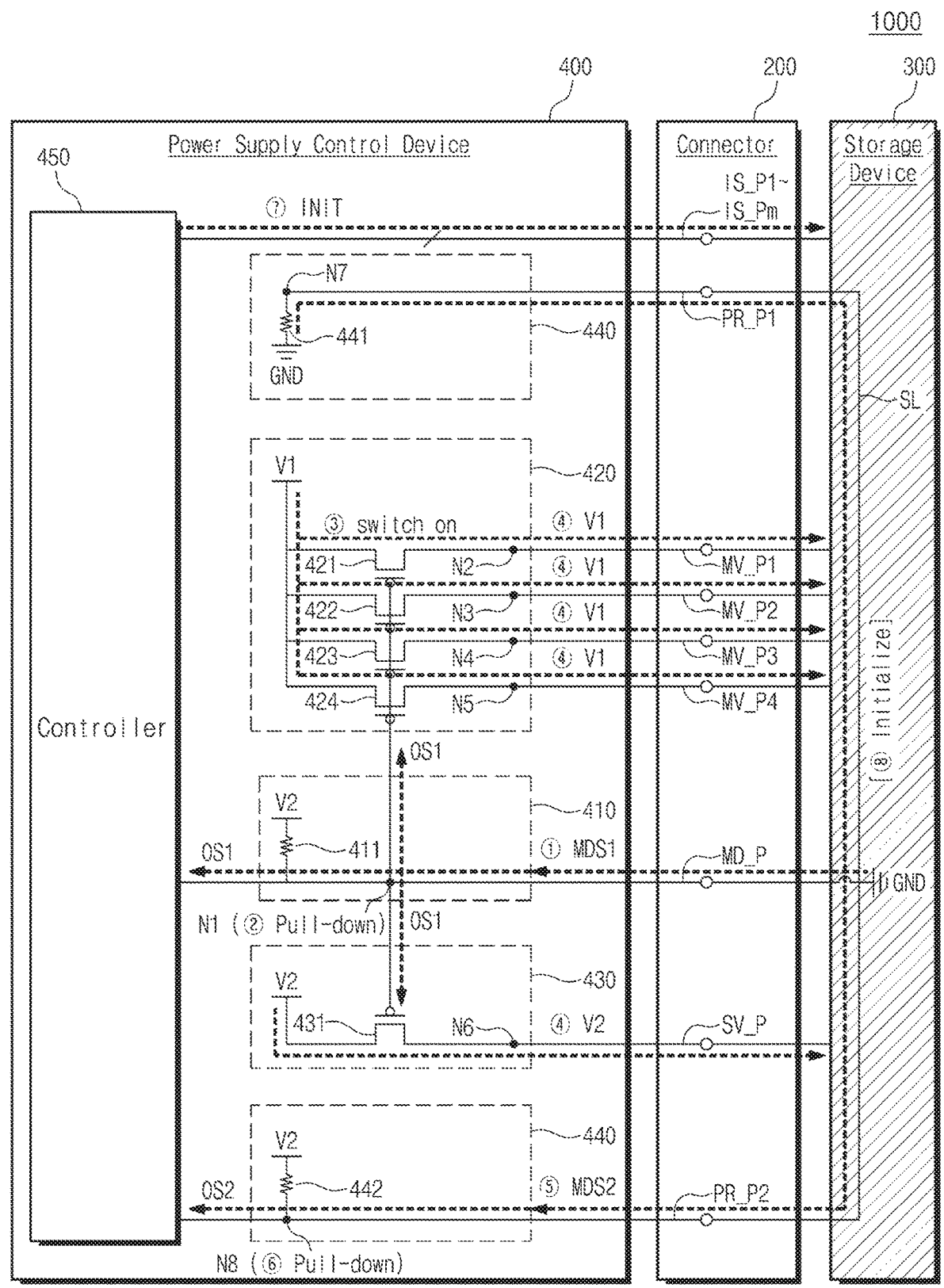
FIG. 6 is a diagram illustrating an example of an operation of a power supply control device of FIG. 3, in the case where a storage device of FIG. 1 is mounted on a connector.

FIG. 6 is a diagram illustrating an example of an operation of a power supply control device of FIG. 3, in the case where a storage device of FIG. 1 is mounted on a connector.

When the storage device 300 is mounted on the connector 200, a signal line of the storage device 300, which is connected with the memory detection pin MD_P, may be connected with a ground terminal GND. As such, the first memory detection signal MDS1 at the second level may be provided from the storage device 300 through the memory detection pin MD_P (①). For example, the second level may be 0 V. The first node N1 may be pulled down to the second level depending on (e.g., in response to) the first memory detection signal MDS1 (②).

If the first node N1 is pulled down to the second level, the first output signal OS1 of the second level may be output. The main switches 421 to 424 and the side switch 431 may be closed in response to the first output signal OS1 of the second level (③). As such, the first voltage V1 may be supplied to the storage device 300 through the first to fourth main voltage pins MV_P1 to MV_P4, and the second voltage V2 may be supplied to the storage device 300 through the sub voltage pin SV_P (④).

When the storage device 300 is mounted on the connector 200, the first present pin PR_P1 and the second present pin PR_P2 may be connected through a signal line SL of the storage device 300. Accordingly, the seventh node N7 and the eighth node N8 of the second memory detection circuit 440 may be connected. The ground terminal GND of the second memory detection circuit 440 may be connected with the seventh node N7 and the eighth node N8 through the first detection resistor 441. As such, the second memory detection signal MD S2 of the second level may be provided from the storage device 300 through the second present pin PR_P2 (⑤). For example, the second level may be 0 V. The eighth node N8 may be pulled down to the second level depending on the second memory detection signal MDS2 (⑥). That is, the first detection resistor 441 may pull down the eighth node N8 to the second level.

When the eighth node N8 is pulled down to the second level, the second output signal OS2 of the second level may be output. In response to the second output signal OS2 changing from the first level to the second level, the controller 450 may provide the initialization signal INIT to the storage device 300 through the first to m-th input signal pins IS_P1 to IS_Pm (⑦). The storage device 300 may perform an initialization operation in response to the initialization signal INIT (⑧).

As described above, when the storage device 300 of the particular standard is mounted, the power supply control device 400 may detect a connection of the storage device 300 and may first supply power to the storage device 300. After the power is supplied to the storage device 300, the power supply control device 400 may initialize the storage device 300. Accordingly, the power may be quickly supplied to the storage device 300, and the initialization operation of the storage device 300 may be quickly performed.

Figure 7:
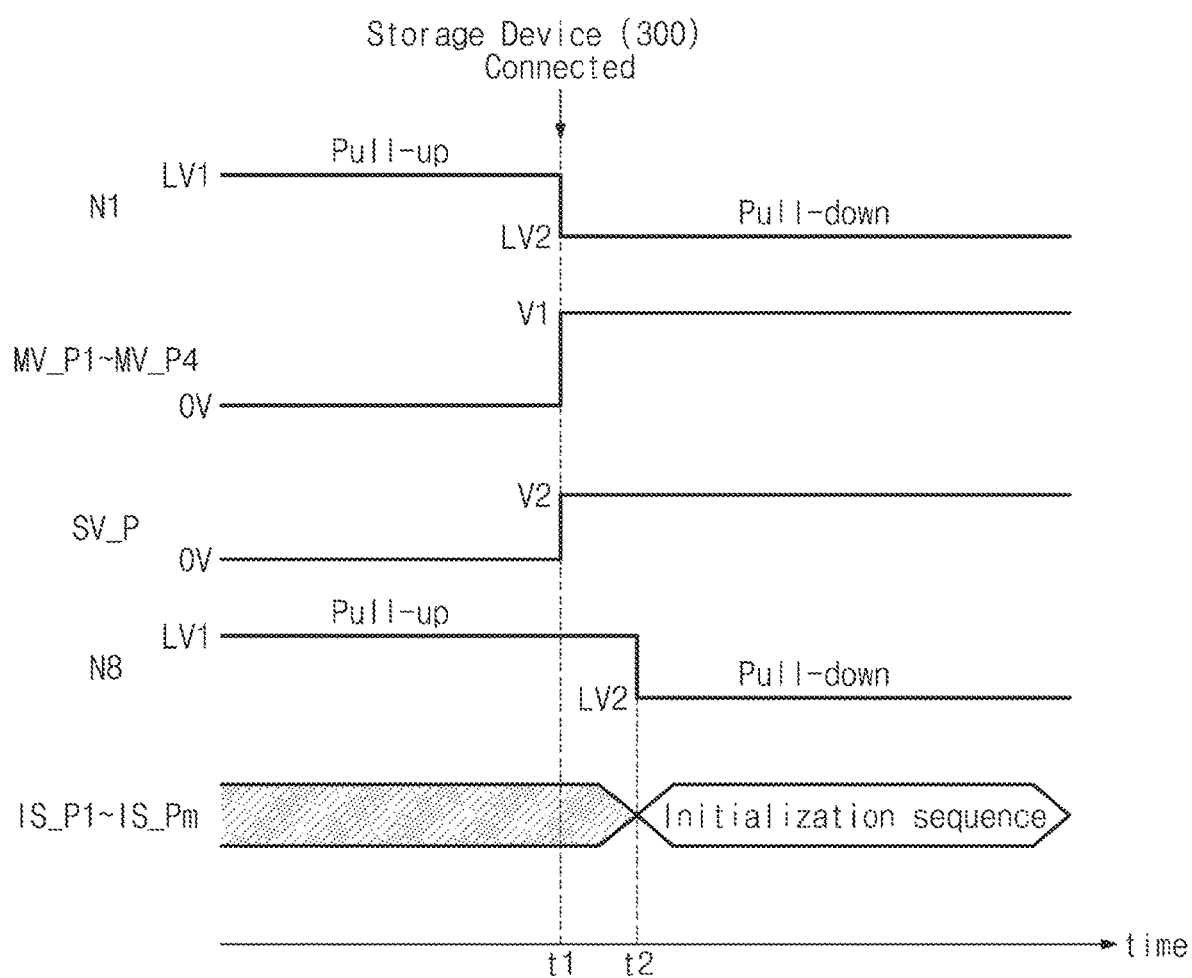
FIG. 7 is a diagram illustrating an example of signals of a power supply control device according to some embodiments of the inventive concepts.

FIG. 7 is a diagram illustrating an example of signals of a power supply control device according to some embodiments of the inventive concepts. A horizontal axis of FIG. 7 represents a time. At a first time t1, the storage device 300 may be mounted on (or otherwise on/connected to) the connector 200.

Referring to FIGS. 4 to 7, before the storage device 300 is mounted on the connector 200 (i.e., before the first time t1), the first node N1 may be in a pull-up state to a first level LV1. In a state where a voltage of the first node N1 corresponds to the first level LV1, the supply of the first voltage V1 and the second voltage V2 may be blocked. As such, a voltage output to the first to fourth main voltage pins MV_P1 to MV_P4 and the sub voltage pin SV_P may be 0 V. Before the storage device 300 is mounted on the connector 200, the eighth node N8 may be in a pull-up state to the first level LV1. In response to a voltage of the eighth node N8 being maintained at the first level LV1, the controller 450 may not provide any signal to the storage device 300. As such, a signal may not be output to the first to m-th input signal pins IS_P1 to IS_Pm.

When the storage device 300 is mounted on the connector 200 (i.e., at the first time t1), the first memory detection circuit 410 may receive the first memory detection signal MDS1. As such, at the first time t1, the first node N1 may be pulled down to the second level LV2 based on the first memory detection signal MDS1. In a state where the first node N1 is at the second level LV2, the first voltage V1 and the second voltage V2 may be supplied to the storage device 300. As such, a voltage output to the first to fourth main voltage pins MV_P1 to MV_P4 may be the first voltage V1, and a voltage output to the sub voltage pin SV_P may be the second voltage V2.

After the first voltage V1 and the second voltage V2 are supplied to the storage device 300 (i.e., at a second time t2), the second memory detection circuit 440 may receive the second memory detection signal MDS2. As such, at the second time t2, the eighth node N8 may be pulled down to the second level LV2 based on the second memory detection signal MDS2. In response to the eighth node N8 changing from the first level LV1 to the second level LV2, the controller 450 may initialize the storage device 300. In the process of initializing the storage device 300, an initialization sequence (or a power-on sequence) may be transmitted through the first to m-th input signal pins IS_P1 to IS_Pm.

As illustrated in FIG. 7, when the storage device 300 is mounted, the first node N1 of the power supply control device 400 may be first pulled down prior to the eighth node N8. As such, after the power is supplied to the storage device 300, the storage device 300 may perform the initialization operation.

Figure 8:
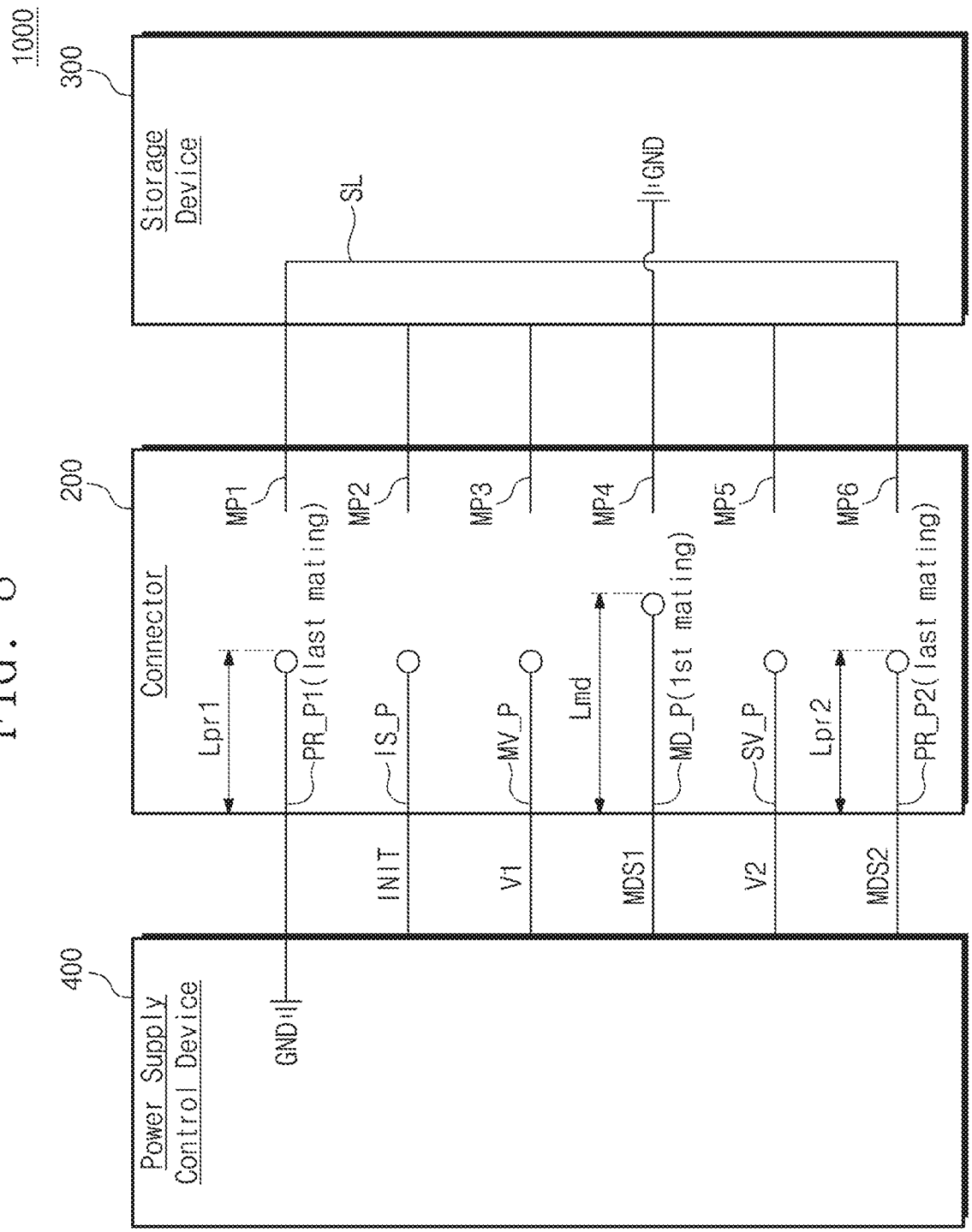
FIG. 8 is a block diagram illustrating an example of a connector of a storage system of FIG. 2.

FIG. 8 is a block diagram illustrating an example of a connector of a storage system of FIG. 2. Referring to FIG. 8, the storage system 1000 may include the connector 200, the storage device 300, and the power supply control device 400. The connector 200 may include the first present pin PR_P1, the input signal pin IS_P, the main voltage pin MV_P, the memory detection pin MD_P, the sub voltage pin SV_P, and the second present pin PR_P2. The storage device 300 may include first to sixth memory pins MP1 to MP6 (e.g., a goldfinger).

The first present pin PR_P1 may be connected with a ground terminal GND of the power supply control device 400. When the storage device 300 is mounted on the connector 200, the first present pin PR_P1 may be connected with the first memory pin MP1 of the storage device 300. The first present pin PR_P1 may correspond to the first present pin PR_P1 of FIG. 4.

When the storage device 300 is mounted on the connector 200, the input signal pin IS_P may be connected with the second memory pin MP2 of the storage device 300. The input signal pin IS_P may be used to transmit the initialization signal INIT provided from the power supply control device 400 to the storage device 300. The input signal pin IS_P may correspond to one of the first to m-th input signal pins IS_P1 to IS_Pm of FIG. 4.

When the storage device 300 is mounted on the connector 200, the main voltage pin MV_P may be connected with the third memory pin MP3 of the storage device 300. The main voltage pin MV_P may be used to transmit the first voltage V1 provided from the power supply control device 400 to the storage device 300. The main voltage pin MV_P may correspond to one of the first to fourth main voltage pins MV_P1 to MV_P4 of FIG. 4.

When the storage device 300 is mounted on the connector 200, the memory detection pin MD_P may be connected with the fourth memory pin MP4 of the storage device 300. The fourth memory pin MP4 may be connected with a ground terminal GND of the storage device 300. As such, when the storage device 300 is mounted on the connector 200, the memory detection pin MD_P may be connected with the ground terminal GND of the storage device 300. The memory detection pin MD_P may be used to transmit the first memory detection signal MD_S1, which is provided from the storage device 300 based on the ground terminal GND of the storage device 300, to the power supply control device 400. The memory detection pin MD_P may correspond to the memory detection pin MD_P of FIG. 4.

When the storage device 300 is mounted on the connector 200, the sub voltage pin SV_P may be connected with the fifth memory pin MP5 of the storage device 300. The sub voltage pin SV_P may be used to transmit the second voltage V2 provided from the power supply control device 400 to the storage device 300. The sub voltage pin SV_P may correspond to the sub voltage pin SV_P of FIG. 4.

When the storage device 300 is mounted on the connector 200, the second present pin PR_P2 may be connected with the sixth memory pin MP6 of the storage device 300. The sixth memory pin MP6 may be connected with the first memory pin MP1 through the signal line SL. As such, when the storage device 300 is mounted on the connector 200, the second present pin PR_P2 may be connected with the first present pin PR_P1. The second present pin PR_P2 may be used to transmit the second memory detection signal MDS2, which is provided from the storage device 300 based on a ground terminal GND of the power supply control device 400, to the power supply control device 400. The second present pin PR_P2 may correspond to the second present pin PR_P2 of FIG. 4.

As illustrated in FIG. 8, a length Lmd of the memory detection pin MD_P may be the longest of lengths of pins included in the connector 200. That is, the memory detection pin MD_P may be the longest one of a plurality of pins included in the connector 200. As such, when the storage device 300 is mounted on the connector 200, the memory detection pin MD_P may be targeted for first mating. That is, the memory detection pin MD_P may be first connected with the fourth memory pin MP4 of the storage device 300 prior to any other pins of the connector 200. As such, the memory detection pin MD_P may first transmit the first memory detection signal MDS1 to the power supply control device 400 prior to the second memory detection signal MDS2. The power supply control device 400 may supply the first voltage V1 and the second voltage V2 in response to the first memory detection signal MDS1.

As illustrated in FIG. 8, a length Lpr1 of the first present pin PR_P1 and a length Lpr2 of the second present pin PR_P2 may be shorter than the length Lmd of the memory detection pin MD_P. Each of the first present pin PR_P1 and the second present pin PR_P2 may be shortest ones of a plurality of pins included in the connector 200. As such, when the storage device 300 is mounted on the connector 200, the first present pin PR_P1 and the second present pin PR_P2 may be targeted for last mating. That is, the first present pin PR_P1 and the second present pin PR_P2 may be connected with the first memory pin MP1 and the sixth memory pin MP6 of the storage device 300 later than any other pins of the connector 200. As such, the second present pin PR_P2 may transmit the second memory detection signal MDS2 to the power supply control device 400 later than the first memory detection signal MDS1. The power supply control device 400 may output the initialization signal INIT in response to the second memory detection signal MDS2. Accordingly, after the power is supplied to the storage device 300, the initialization operation of the storage device 300 may be sequentially performed.

An example is illustrated in FIG. 8 in which the first present pin PR_P1 and the second present pin PR_P2 are targeted for last mating, but the inventive concepts are not limited thereto. For example, one, but not the other, of the first present pin PR_P1 or the second present pin PR_P2 may be targeted for last mating.

For convenience of description, an example is illustrated in FIG. 8 in which one pin is provided for each respective function (e.g., as one input signal pin IS_P and one main voltage pin MV_P are provided), but the inventive concepts are not limited thereto. For example, the connector 200 may include a plurality of pins performing the same function.

Also, for convenience of description, an example is illustrated in FIG. 8 in which the remaining pins other than the memory detection pin MD_P have the same length, but the inventive concepts are not limited thereto. For example, at least one of the first present pin PR_P1 and the second present pin PR_P2 may be shorter in length than any other pins.

As described above, the power supply control device 400 may detect that the storage device 300 of the particular standard is mounted on (or is otherwise on/connected to) the connector 200, and may provide power to the storage device 300. For example, as illustrated in FIG. 8, the first memory pin MP1 and the sixth memory pin MP6 of the storage device 300 may be connected by the signal line SL, and the fourth memory pin MP4 may be connected to the ground terminal GND. In response to detecting that no storage device is mounted on the connector 200 or a storage device of a different standard is mounted on the connector 200, the power supply control device 400 may block the supply of the power. Accordingly, in response to detecting that a storage device of a different standard is mounted on the connector 200, the power supply control device 400 may prevent/protect the storage device of the different standard from being damaged by the supply of the power.

Figure 9:
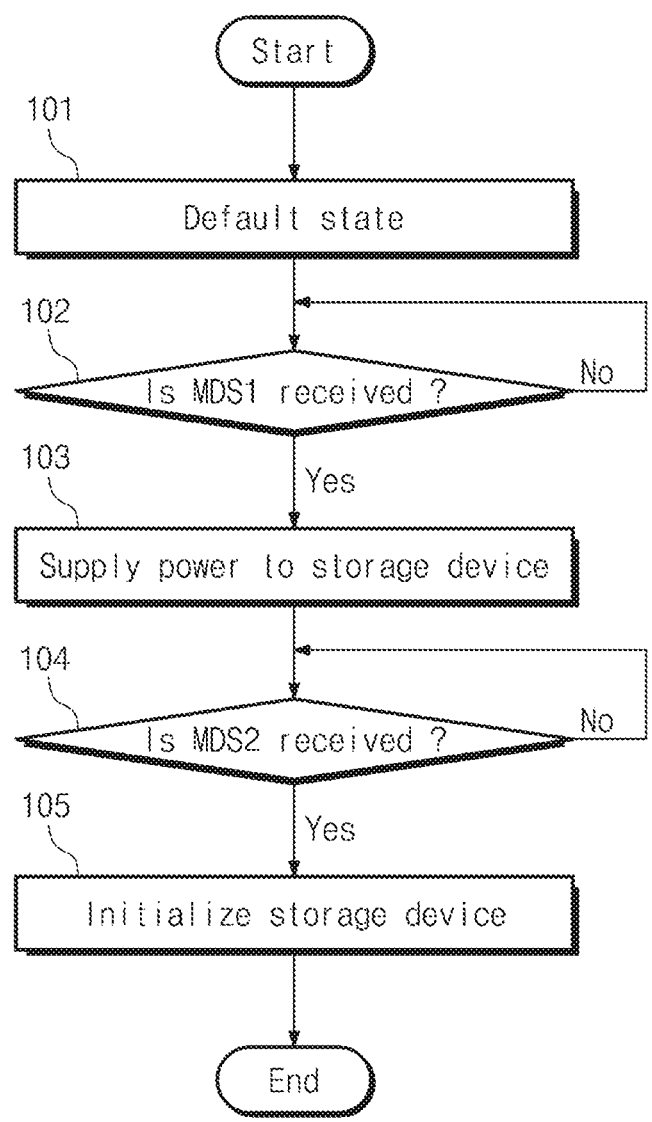
FIG. 9 is a flowchart illustrating an operation of a power supply control device of FIG. 2.

FIG. 9 is a flowchart illustrating an operation of a power supply control device of FIG. 2. Referring to FIGS. 2 and 9, in Block 101, the power supply control device 400 may be in a default state. The default state may refer to a state in which the power supply control device 400 blocks the supply of power and does not output a signal. In response to detecting that the storage device 300 is not mounted, the power supply control device 400 may maintain the default state.

In Block 102, the power supply control device 400 may detect whether the first memory detection signal MDS1 is received. When the first memory detection signal MDS1 is received, the power supply control device 400 may determine that the storage device 300 is mounted. When the first memory detection signal MDS1 is not received, the power supply control device 400 may determine that the storage device 300 is not mounted. For example, the power supply control device 400 may detect whether the first memory detection signal MDS1 is received, by detecting a change in a voltage of the first node N1 of FIG. 4.

When the first memory detection signal MDS1 is received, in Block 103, the power supply control device 400 may supply power to the storage device 300. If the first memory detection signal MDS1 is not received, the power supply control device 400 may maintain the default state until the first memory detection signal MDS1 is received. That is, in response to detecting that the storage device 300 is connected, the power supply control device 400 may provide power to the storage device 300.

In Block 104, the power supply control device 400 may detect whether the second memory detection signal MDS2 is received. For example, the power supply control device 400 may detect whether the second memory detection signal MDS2 is received, by detecting a change in a voltage of the eighth node N8 of FIG. 4.

When the second memory detection signal MDS2 is received, in Block 105, the power supply control device 400 may initialize the storage device 300. For the initialization of the storage device 300, the power supply control device 400 may provide the initialization signal INIT to the storage device 300. The storage device 300 may perform the initialization operation in response to the initialization signal INIT.

Figure 10:
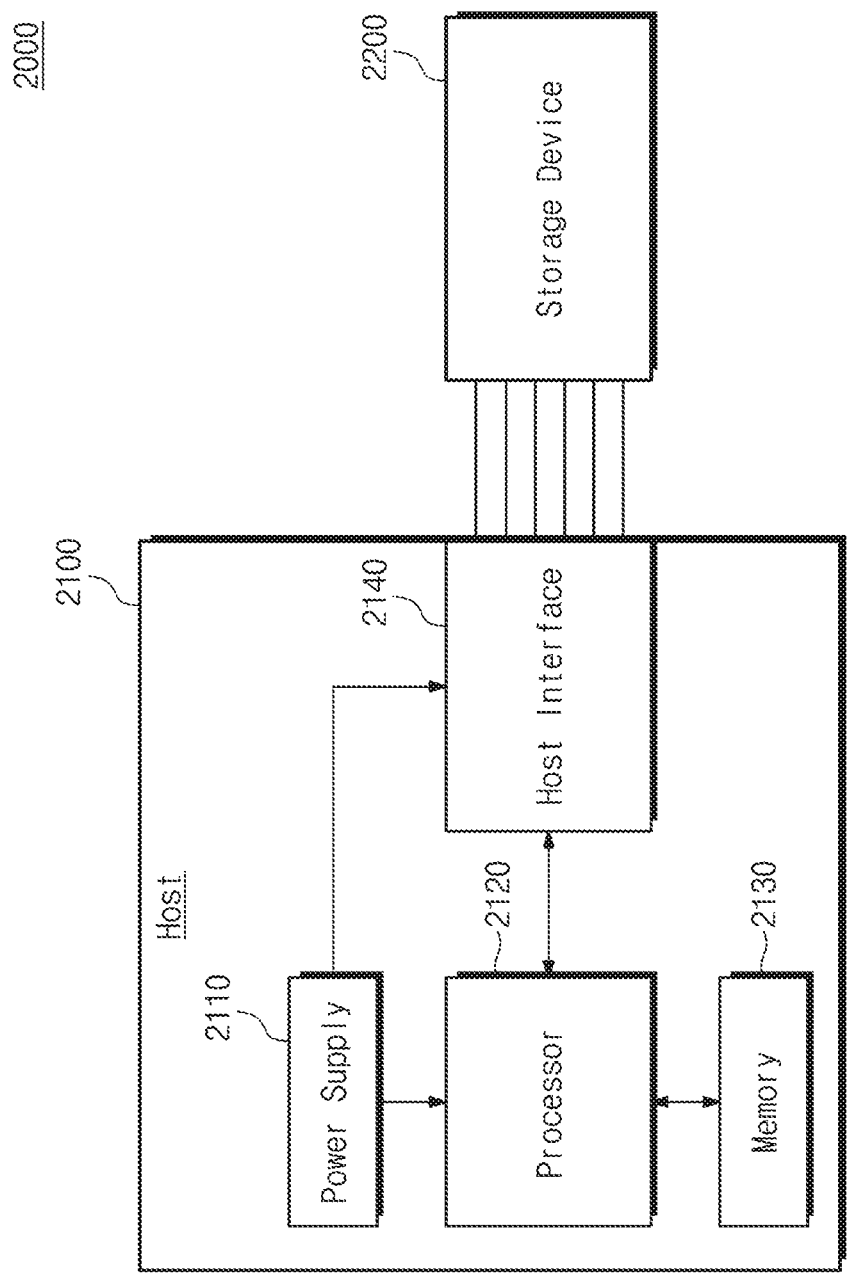
FIG. 10 is a block diagram illustrating a computing system including a storage system according to some embodiments of the inventive concepts.

FIG. 10 is a block diagram illustrating a computing system including a storage system according to some embodiments of the inventive concepts. Referring to FIG. 10, a computing system 2000 may include a desktop computer, a server, and a mobile device. The computing system 2000 may include a host 2100 and a storage device 2200.

The host 2100 may include a power supply 2110, a processor 2120, a memory 2130, and a host interface 2140. The power supply 2110 may provide power to devices and circuits of the host 2100. For example, the power supply 2110 may supply power to the processor 2120 and the host interface 2140.

The processor 2120 may perform overall operations of the computing system 2000. For example, the processor 2120 may control operations of the memory 2130 and the host interface 2140. The processor 2120 may control the storage device 2200 through the host interface 2140.

The memory 2130 may store data processed or to be processed by the processor 2120. For example, the memory 2130 may be implemented with a volatile memory or a nonvolatile memory.

The host interface 2140 may supply power to the storage device 2200, and may transmit data provided from the processor 2120. The host interface 2140 may provide various signals to the storage device 2200 under control of the processor 2120. The host interface 2140 may include the power supply control device 100 or 400 and the connector 200 described with reference to FIGS. 1 to 9.

The storage device 2200 may be connected with the host 2100 through the host interface 2140. For example, the storage device 2200 may be mounted on the host 2100 through edge pins (e.g., a goldfinger) to connect with the host 2100. The storage device 2200 may be supplied with power through the host interface 2140 and may receive a signal through the host interface 2140. The storage device 2200 may store data provided from the host 2100 and may provide the stored data to the host 2100. The storage device 2200 may include the storage device 300 described with reference to FIGS. 1 to 9. As such, in response to detecting that the storage device 2200 of a particular standard is connected to the host interface 2140, the host interface 2140 may supply power to the storage device 2200.

A host interface device according to the inventive concepts may prevent/protect a storage device of a different standard from being damaged by blocking the supply of power, in response to detecting that the storage device is mounted on (or is otherwise on/connected to) a connector.

Also, the host interface device according to the inventive concepts may quickly supply power to a storage device of a particular predetermined form factor.

Though the inventive concepts have been described with reference to example embodiments thereof, it will be apparent to those of ordinary skill in the art that various changes and modifications may be made thereto without departing from the scope of the inventive concepts as set forth in the following claims.

What is claimed is:

1. A host interface device comprising:
   a first pin electrically connected to a first node of the host interface device;
   a second pin electrically connected to a second node of the host interface device;
   a switch electrically connected between the second node and a first voltage terminal, and configured to operate in a closed state to provide a voltage from the first voltage terminal to the second pin in response to a voltage level of the first node;
   a pull-up resistor electrically connected between the first node and a second voltage terminal;
   a third pin electrically connected to a third node;
   a fourth pin electrically connected to a fourth node;
   a first detection resistor electrically connected between the third node and a ground terminal of the host interface device; and
   a second detection resistor electrically connected between the fourth node and the second voltage terminal,
   wherein the host interface device is configured to receive a memory detection signal from a storage device via the first pin when the first pin is electrically connected to the storage device,
   wherein the memory detection signal comprises a first memory detection signal, and
   wherein, when the third pin and the fourth pin are electrically connected to the storage device, the host interface device is further configured to transmit a second memory detection signal to the storage device via the third pin, and the host interface device is further configured to receive the second memory detection signal from the storage device via the fourth pin.

2. The host interface device of claim 1,
   wherein the pull-up resistor is configured to maintain the voltage level of the first node at a first level when the first pin is not electrically connected to the storage device, and
   wherein the voltage level of the first node is pulled down to a second level in response to the memory detection signal when the first pin is electrically connected to the storage device.

3. The host interface device of claim 1,
   wherein, when the storage device has a particular form factor, the first pin is electrically connected to a ground terminal of the storage device,
   wherein, when the storage device has a different form factor from the particular form factor, the first pin is not electrically connected to any pin of the storage device, or the first pin is electrically connected to a pin or signal line of the storage device that is open, and
   wherein the switch is further configured to operate in an open state to block supply of the voltage to the storage device when the storage device has the different form factor.

4. The host interface device of claim 1, wherein the switch comprises a first switch, and wherein the host interface device further comprises:
   a fifth pin electrically connected to a fifth node; and
   a second switch electrically connected between the fifth node and the first voltage terminal, and configured to provide the voltage from the first voltage terminal to the fifth pin in response to the voltage level of the first node.

5. The host interface device of claim 1, wherein the voltage comprises a first voltage, wherein the host interface device further comprises:
   a fifth pin electrically connected to a fifth node; and
   a side switch electrically connected between the fifth node and the second voltage terminal, and configured to provide a second voltage from the second voltage terminal to the fifth pin in response to the voltage level of the first node, and
   wherein the second voltage is lower than the first voltage.

6. The host interface device of claim 1,
   wherein, when the third pin and the fourth pin are not electrically connected to the storage device, the second detection resistor is configured to maintain a voltage level of the fourth node at a first level, and
   wherein, when the third pin and the fourth pin are electrically connected to the storage device, the first detection resistor is configured to pull down the voltage level of the fourth node to a second level.

7. The host interface device of claim 6, further comprising:
   a fifth pin through which the host interface device is further configured to transmit an initialization signal to the storage device when the voltage level of the fourth node changes from the first level to the second level.

8. The host interface device of claim 1, wherein the first pin is longer than the fourth pin.

9. A power supply control device that is electrically connectable to a storage device through a plurality of pins of a connector, the power supply control device comprising:
   a first memory detection circuit configured to output a first output signal at a first level in response to detecting that the storage device is not electrically connected to the connector, and to output the first output signal at a second level in response to a first memory detection signal transmitted through a first pin of the plurality of pins from the storage device when the storage device is electrically connected to the connector;
   a second memory detection circuit configured to output a second output signal at the first level in response to detecting that the storage device is not electrically connected to the connector, and to output the second output signal at the second level in response to a second memory detection signal transmitted through a second pin of the plurality of pins from the storage device when the storage device is electrically connected to the connector;
   a controller configured to initialize the storage device in response to the second output signal being at the second level; and
   a voltage supply circuit configured to block a supply of a voltage in response to the first output signal being at the first level, and to supply the voltage to the storage device in response to the first output signal being at the second level.

10. The power supply control device of claim 9, wherein the first pin is longer than the second pin.

11. The power supply control device of claim 9, wherein the voltage supply circuit comprises a first voltage supply circuit, wherein the voltage comprises a first voltage, and wherein the power supply control device further comprises:
a second voltage supply circuit configured to block a supply of a second voltage that is smaller than the first voltage in response to the first output signal being at the first level, and to supply the second voltage to the storage device in response to the first output signal being at the second level.

12. The power supply control device of claim 9,
wherein the first memory detection circuit comprises a pull-up resistor configured to maintain the first output signal at the first level when the storage device is not electrically connected to the connector, and
wherein the first output signal is pulled down to the second level when the storage device is electrically connected to the connector.

13. The power supply control device of claim 9, wherein the voltage supply circuit comprises:
a switch configured to supply the voltage to the storage device through a third pin of the plurality of pins in response to the first output signal being at the second level.

14. A connector that electrically connects a storage device and a power supply control device, the connector comprising:
a memory detection pin through which the power supply control device is configured to receive a memory detection signal from the storage device when the storage device is electrically connected to the connector;
a voltage pin through which the power supply control device is further configured to supply a voltage to the storage device in response to the memory detection signal;
a first present pin electrically connected to a ground terminal of the power supply control device; and
a second present pin electrically connected to the first present pin when the storage device is electrically connected to the connector,
wherein a length of the memory detection pin is a longest length of a plurality of lengths of a plurality of pins included in the connector, such that the memory detection pin is configured to electrically connect with the storage device before any other of the plurality of pins included in the connector,
wherein the memory detection signal comprises a first memory detection signal,
wherein the power supply control device is further configured to receive a second memory detection signal from the storage device via the second present pin,
wherein a length of at least one of the first present pin or the second present pin is a shortest length of the plurality of lengths of the plurality of pins included in the connector, and
wherein the connector further comprises an input signal pin through which the power supply control device is further configured to transmit an initialization signal to the storage device in response to the second memory detection signal.

15. The connector of claim 14, wherein the voltage pin comprises a first voltage pin, wherein the voltage comprises a first voltage, and wherein the connector further comprises:
a second voltage pin through which the power supply control device is further configured to supply a second voltage that is smaller than the first voltage to the storage device in response to the memory detection signal.

16. The connector of claim 14,
wherein, when the storage device comprises a particular form factor, the memory detection pin is electrically connected to a ground terminal of the storage device, and
wherein, when the storage device has a different form factor from the particular form factor, the memory detection pin is not electrically connected to any pin of the storage device, or the memory detection pin is electrically connected to a pin or signal line of the storage device that is open.

* * * * *